Feb. 16, 1926.

G. A. LOVETT 1,573,642

VEHICLE BUMPER

Filed August 8, 1924

INVENTOR
George A. Lovett

ATTORNEYS

Patented Feb. 16, 1926.

1,573,642

UNITED STATES PATENT OFFICE.

GEORGE A. LOVETT, OF DETROIT, MICHIGAN, ASSIGNOR TO GENERAL MOTORS CORPORATION, OF DETROIT, MICHIGAN, A CORPORATON OF DELAWARE.

VEHICLE BUMPER.

Application filed August 8, 1924. Serial No. 730,861.

*To all whom it may concern:*

Be it known that I, GEORGE A. LOVETT, a citizen of the United States, and a resident of Detroit, county of Wayne, and State of Michigan, have invented certain new and useful Improvements in Vehicle Bumpers, of which the following is a full, clear, concise, and exact description, such as will enable others skilled in the art to which the invention relates to make and use the same, reference being made therein to the accompanying drawings, which form a part of this specification.

This invention relates to vehicle bumpers, and is illustrated as embodied in a double bar bumper for one end of an automobile. An object of the invention is to provide a light but strong and resilient bumper, by carrying both ends of each of the bumper bars around until they abut against each other in engagement with the rear center of the bar, thus forming of each bar in effect a pair of integral elliptic springs. A clamp engages from the front the front faces of the centers of the bars, and from the rear the abutting ends of the bars, and also has a portion projecting between the bars to space them apart. The bumper-attaching brackets also serve to secure the bars together near the ends of the bumper.

The above and other objects of the invention, together with one desirable arrangement of the bumper parts, will be apparent from the following description of the embodiment shown in the accompanying drawings, in which.

Figure 1:
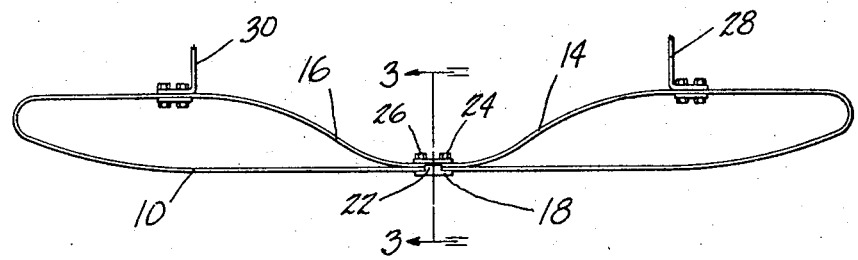
Figure 1 is a top plan view of a bumper.
Figure 2:
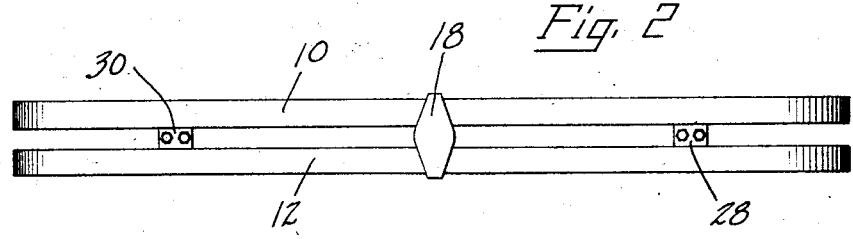
Figure 2 is a front elevation of the bumper.
Figure 3:
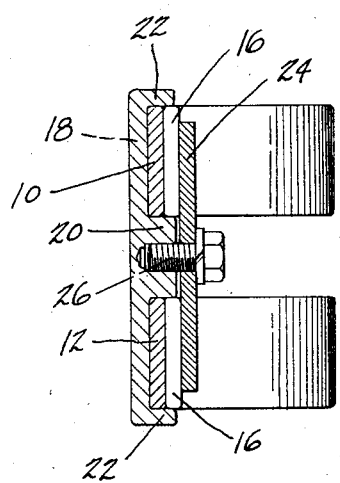
Figure 3 is a central vertical section through the bumper, on the line 3—3 of Figure 1.

The bumper is made up of two vertically-spaced parallel flat spring bars 10 and 12, arranged to extend entirely across the front or rear of an automobile. The ends 14 and 16 of each bar are carried around rearwardly until they abut against each other, in engagement with the rear center of the bar. At the center of the bumper is a clamp, the front member 18 of which engages the front faces of the bars. Member 18 has a lug 20 projecting between the bars to space them vertically apart, and upper and lower fingers 22 engaging the top of bar 10 and the bottom of bar 12. The rear member of the clamp is a plate 24 held by screws 26 threaded into lug 20. The attaching brackets 28 and 30 also serve to clamp the bars together near the ends of the bumper.

It is not my intention to limit the scope of the invention to the exact construction shown, or otherwise than by the terms of the appended claims.

I claim:

1. A vehicle bumper comprising, in combination, two parallel vertically-spaced flat bars of identical form, each extending entirely across the end of the vehicle and looped around at both its ends with the ends abutting against each other and resting against the back of the center of the bar to form substantially a pair of integral full-elliptic springs, a clamp engaging from the rear the abutting ends of the upper and lower bars and engaging from the front the centers of the bars and which has a portion spacing the upper and lower bars apart, and brackets for connecting the bumper to a vehicle frame and which clamp the upper and lower bars together near the ends of the bumper.

2. A vehicle bumper comprising a spring bar extending across the end of the vehicle and looped backwardly at opposite sides of the vehicle to bring these ends into abutting engagement, the abutting ends also lying against the rear face of the front bumper bar, means holding the ends of the bar in the said position and means to support the bumper on a vehicle.

In testimony whereof I affix my signature.

GEORGE A. LOVETT.